Feb. 10, 1953 C. C. NICHOLS 2,627,611
COMBINATION INVALID STRETCHER CARRIER
Filed April 11, 1951 3 Sheets-Sheet 3
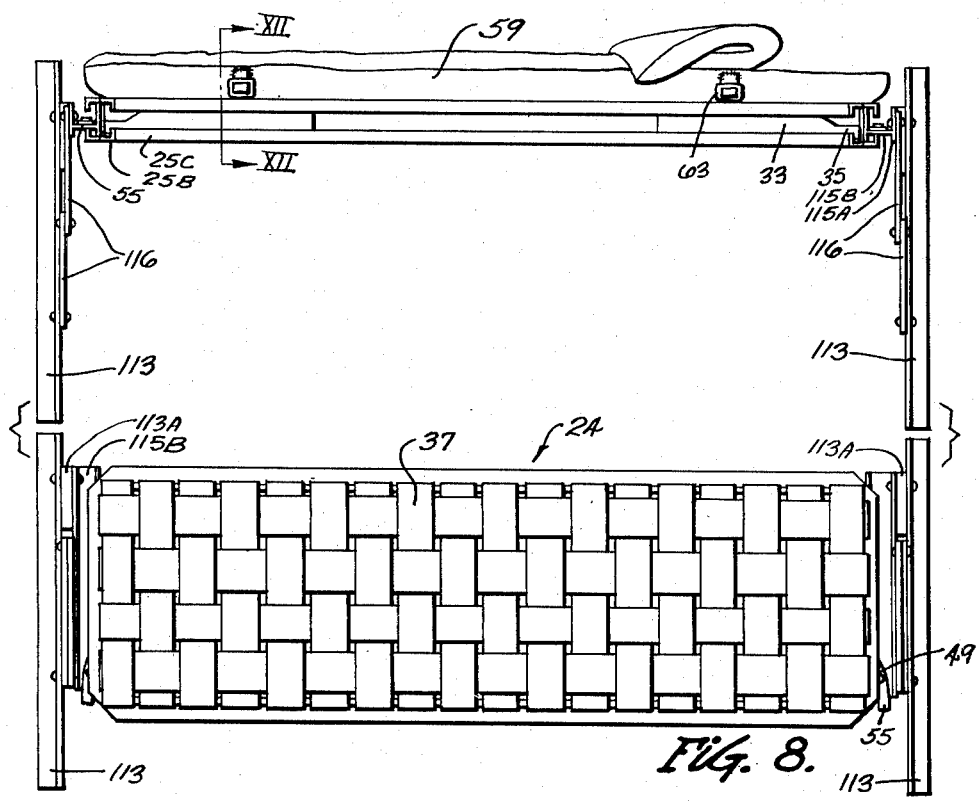
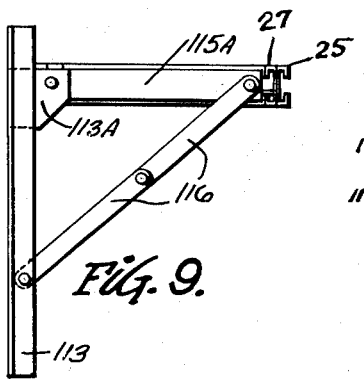
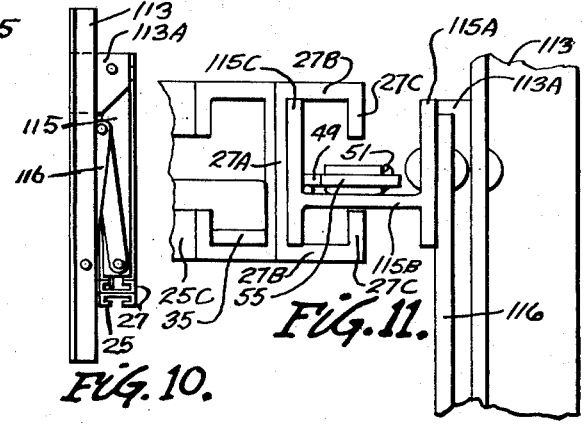
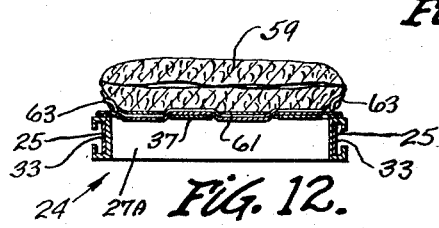
Inventor
CECIL C. NICHOLS
By Weatherford and Weatherford
Attorneys Patented Feb. 10, 1953

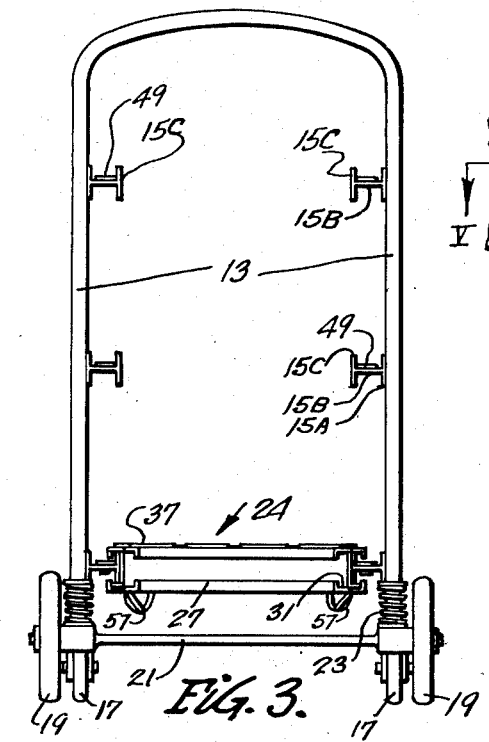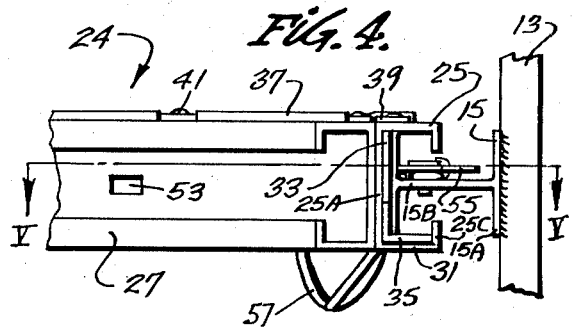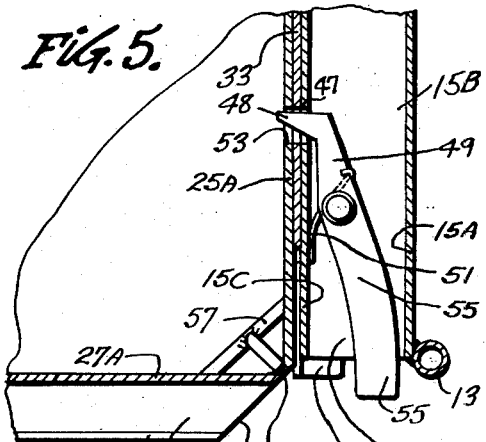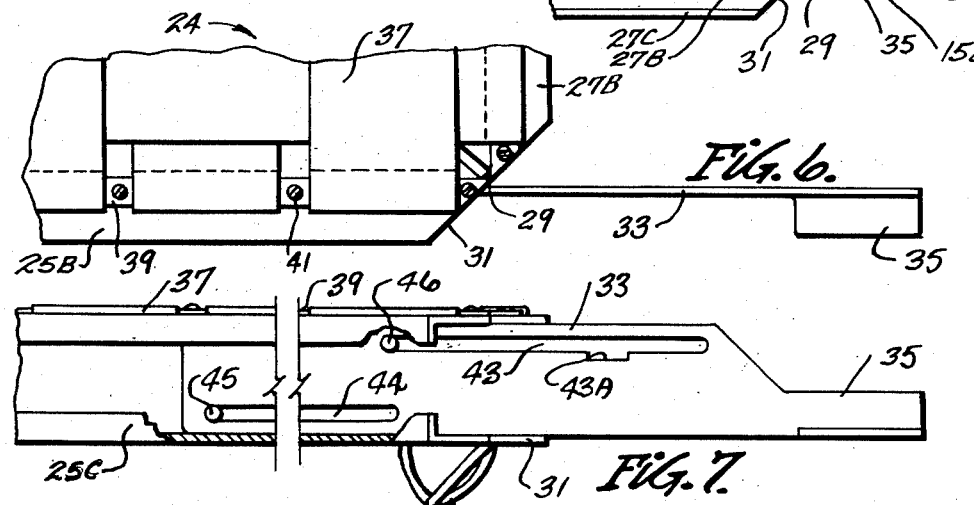

2,627,611

UNITED STATES PATENT OFFICE 2,627,611

COMBINATION INVALID STRETCHER CARRIER

Cecil C. Nichols, Memphis, Tenn.

Application April 11, 1951, Serial No. 220,469

11 Claims. (Cl. 5—8)

This invention relates to certain new and useful improvements in stretchers, particularly adapted for use in connection with invalids, injured persons and the like and to carrier racks used in combination with such stretchers whereby a plurality of improved stretchers may be simultaneously transported.

The principal object of the invention is to provide a wheeled rack for use in combination with a plurality of the stretchers of this invention, including new and useful improvements in means for removably positioning the stretchers in relation to the rack.

A further object of the invention is to provide a rack for a plurality of stretchers having flanged rails adapted to engage stretcher-carried means for sliding engagement of the stretchers upon the carrier.

A further object of the invention is to provide stretchers with channel-shaped frame members adapted to slidably engage flanged rails for removable support.

A further object of the invention is to provide stretchers with retractable and extendable handles.

A further object of the invention is to provide new and novel latching means for retaining a stretcher upon a support as upon a carrier rack, or other supporting means.

A further object of the invention is to generally improve the design, utility and efficiency of stretchers and to generally improve the design, utility and efficiency of carrier racks adapted to transport a plurality of stretchers.

A further object of the invention is to provide new and novel means for supporting stretchers.

The means by which the foregoing and other objects of the present invention are accomplished and the manner of their accomplishment will readily be seen from the following specification upon reference to the accompanying drawings, in which:

Fig. 3 is an end elevational view showing the carrier rack with one stretcher in position thereon.

Fig. 4 is a fragmentary front elevational view on an enlarged scale illustrating details of the arrangement of the parts as seen in Fig. 3.

Fig. 5 is a fragmentary sectional plan view taken as on the line V—V of Fig. 4.

Fig. 6 is a fragmentary top plan view of the preferred form of stretcher illustrating certain details of construction.

Fig. 7 is a fragmentary side elevational view of the parts as seen in Fig. 6, with certain portions broken away for purposes of illustration.

Fig. 8 is a side elevational view of a variation in supporting means for a stretcher showing the support and stretcher in raised and lowered positions.

Fig. 9 is an end view of a stretcher and support in the raised position of the upper portion of Fig. 8.

Fig. 10 is an end view of a support and stretcher in lowered position, as shown in the lower portion of Fig. 8.

Fig. 11 is a fragmentary front view on an enlarged scale of a portion of the device as shown in Fig. 8; and Fig. 12 is a sectional view taken as on the line XII—XII of Fig. 8.

Figure 1:
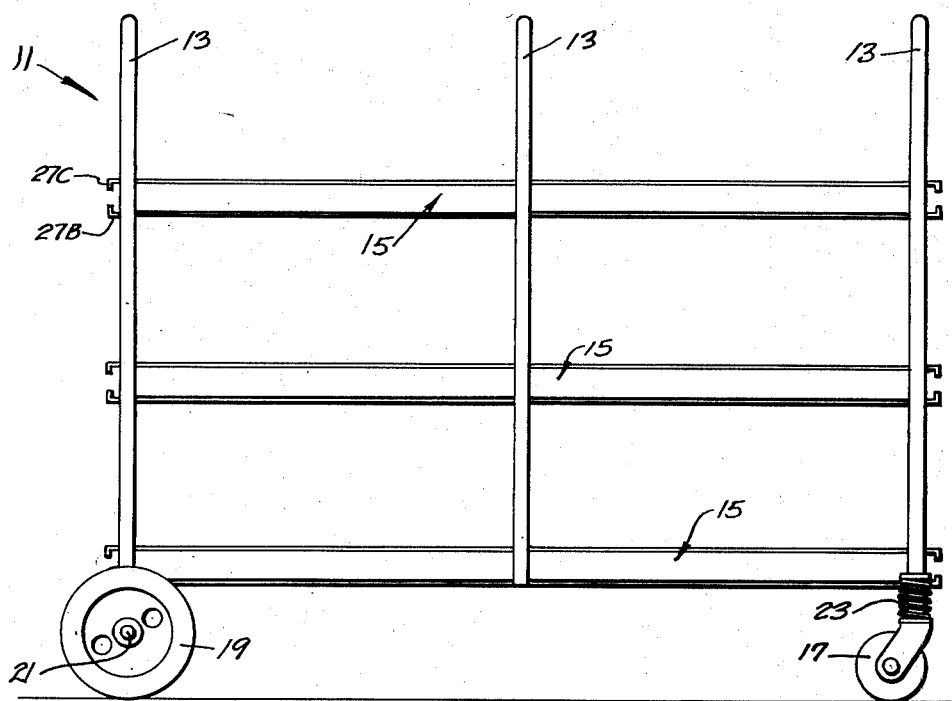
Fig. 1 is a side elevational view of the carrier rack of the present invention with a plurality of stretchers positioned thereon.

Referring now to the drawings in which the various parts are indicated by numerals, the present invention comprises a carrier rack 11 consisting preferably of a plurality of upstanding U-shaped members 13 arranged in parallelism and joined together by longitudinally extending side rails 15. The side rails 15 are arranged in opposite pairs, each pair being disposed in a common plane and being particularly adapted, in the manner hereinafter described, to serve as sliding supports for the preferred form of stretchers employed with the present invention.

Front and rear frame members 13 are preferably extended below the level of the lowest of the rails 15 to form legs for the device with caster wheels 17 being mounted upon the rear legs thus formed and front wheels 19 being mounted upon suitable axles 21 carried by the front legs thus formed. Preferably suitable cushioning compression springs 23 are interposed above the wheel mountings to cushion the wheels in use.

Each of the rails 15 is preferably formed as an H member with the outer vertical leg 15A of the H rigidly fixed as by welding to the uprights 13 of the U-shaped frame members. The webs 15B of the rail members 15 are disposed horizontally and carry at their inner edges vertical inner legs 15C. The respective opposite pairs of rails 15 are arranged, as best shown in Fig. 3, in vertically spaced relation so as to provide spaced opposite supports adapted to receive suitable cooperating and complementary runners of stretchers 24 to be carried upon the carrier rack 11. It will be observed that the carrier is thus formed of a plurality of uprights or frame members 13 joined longitudinally by rails 15 with the rails arranged in vertically spaced pairs for the purposes stated.

The preferred embodiment of the stretcher 24, adapted to be used in the present combination, comprises a frame consisting of a pair of side runners 25 and a pair of end members 27, side runners 25 and end members 27 being preferably joined at their corners as by welding 29, as best shown in Fig. 5. The side runners and end members are preferably each formed of an outwardly open box channel section, the side runners each having a vertical web 25A and upper and lower outwardly projecting flanges 25B, which are vertically spaced apart to slidably receive and accommodate the length of rail inner legs 15C, the ends of the runners being open for introduction of the rails. Similarly the end members have vertical webs 27A, and upper and lower outwardly projecting flanges 27B which are vertically spaced apart, similar to the spacing of flanges 25B. Preferably horizontal flanges 25B are respectively provided at their outer edges with vertically disposed minor flanges 25C positioned so as to restrict the spacing between the horizontal flanges and to limit such space so as to prevent accidental lateral displacement of inner leg 15C from engagement between the flanges and flanges 27B are provided with similar minor flanges 27C. Side runners 25 and end members 27 are also preferably beveled adjacent their junctions, as at 31, so as to better provide for access to the interiors thereof.

Slidably mounted in side runners 25 are handles 33, each of the handles preferably consisting of a vertical flat, plate-like body of a size to be longitudinally slidably moved between upper and lower horizontal flanges 25B. At their respective ends each of the handles 33 is provided with an angularly turned grip portion 35 for convenient use when the handle is extended for manual carrying of the stretcher. Spanning from end to end and side to side of the stretcher is a webbing 37, preferably composed of strips interlaced, each strip at its opposite ends being provided with a loop or pocket formed by turning back the free end of the strip and securing same as by sewing, the loops or pockets being adapted to be slidably engaged by the side and end straps 39 which are preferably removably attached as by screws 41 to the upper surface of the upper horizontal flanges 25B so as to removably attach webbing 37 to the stretcher.

Each of the handles 33 is provided with a pair of elongated slots 43, 44 slidably engaging upper and lower pins 45, 46 carried by the vertical web of the side runners 25, the interengagement of the slots and pins being adapted to limit the longitudinal movement of handles 23 relative to side runners 25 so as to prevent accidental removal of the handles from the side runners and also to limit telescoping movement of the handles within the runners to prevent overtravel beyond an access position, such as that shown in Fig. 5, in which the handle grip 35 is illustrated as lying adjacent beveled corner 31 so as to lie within the general rectangular limits of the stretcher while being available at the cut-off corners.

Preferably each of the rails 15 is provided adjacent its front and rear ends with latching means for removably retaining positioned stretchers mounted upon the carrier rack against accidental displacement when in use. Such latching means preferably comprise an aperture 47 formed in rail inner leg 15C and positioned to receive the latching end or finger 48 of a spring loaded pawl 49, pawls 49 being pivotally mounted upon rail webs 15B and being urged as by springs 51 toward engagement with apertures 47. The latching end or finger 48 of pawl 49 is of a length to project through and beyond aperture 47 and upper handle slot 43 is preferably cut out along its lower edge as at 43A to register upon movement of handle 33 to storage position with aperture 47 and to further register with an additional aperture 53 formed in webs 25A of side runners 25.

As best seen in Fig. 5, finger 48 of pawl 49 projects through and beyond the three registered openings and is positioned to prevent longitudinal movement of stretcher 24 relative to the carrier rack 11, thus locking same in place. It will be seen that pawl 49 is provided with a handle portion 55 projecting conveniently beyond the end of rail 15 for convenient use to move the pawl finger to unlatched position out of the openings so as to permit removal of the stretcher from the rack when desired.

Preferably the stretcher is provided at its four corners with depending legs 57, each leg being preferably formed in the form of an inverted bowed tripod. The legs are of such length as to support a stretcher upon a support, such as a floor, yet are of abbreviated length so as not to interfere with the stretcher next below.

Figure 2:
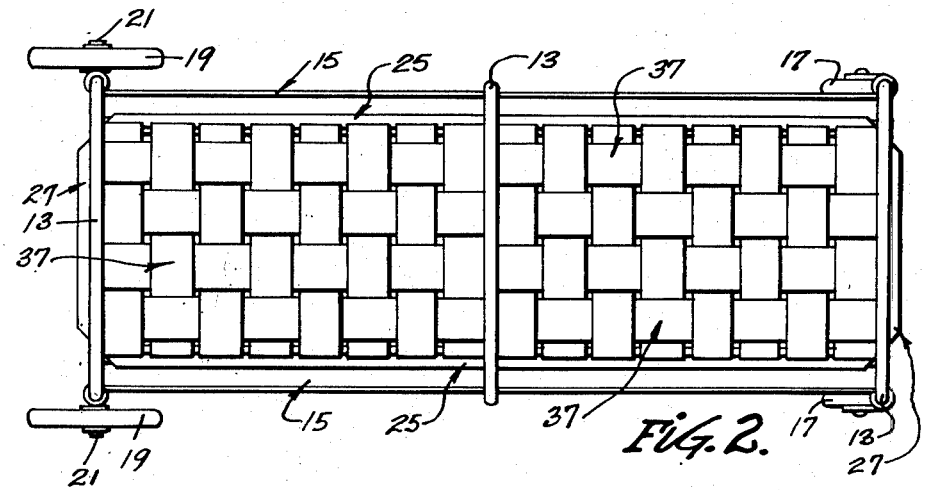
Fig. 2 is a top plan view of the combined stretchers and carrier rack.

In the use of the device, as for example with injured persons, webbing 37 may become soiled in various manners and by virtue of the removable attachment of attachment straps 39 the webbing may be readily removed, replaced by a new webbing and use of the stretcher is substantially uninterrupted. When it is desired to mount the stretcher upon the carrier rack the cut-off open ends of side runners 25 are engaged over the rail legs 15C and the stretcher may be longitudinally slid along the rails until it has reached the loaded position indicated in Figs. 1 and 2, with the rail legs being positioned laterally outward from the body of handles 33. Handles 33 may then be retracted into stored position, in which the handles are interposed between rail legs 15C and runner webs 25A, bringing slot cut-outs 43A into register with apertures 47, 53, and providing a combination latch opening for the reception of pawl finger 48. It will be seen that when the handle is extended to the positions shown in Figs. 6 and 7, slot cutout 43A is moved out of register with side runner aperture 53, preventing the latching entry of pawl finger 48 into engagement with the stretcher runner aperture 53 until handle 33 has been nested in stored position.

A variation in supporting means for the stretcher of the invention is illustrated in Figs. 8 to 11, in which are shown supports adapted to slidably engage end members 27 of stretcher 24 in manner similar to the previously described engagement of side runners 25, the sliding engagement of end members 27, providing for end support of the stretcher adapting the device particularly for removable attachment to supports such as might be used in vehicles in the nature of railway cars, trucks and the like or air planes.

In the variation illustrated, the supports include longitudinally spaced uprights 113, which may be formed of angle members, as shown in Figs. 3 to 11, or other suitable members. Carried by uprights 113 are H-shaped rails 115, each rail 115 including a vertical outer leg 115A, a horizontal web 115B and a vertical inner leg 115C. Preferably rails 115 are pivotally attached to uprights 113 and for this purpose each of the uprights 113 may be provided with a rigidly fixed bracket 113A, to which brackets the vertical rail legs 115A are preferably pivotally attached, as by a suitable pin. Each of the pivotally attached rails 115 is connected to uprights 113 for movement to and from raised position, from and to lowered position by a toggle 116, toggles 116 each consisting of a pair of pivotally connected links, one of the links being pivoted at one end to vertical rail legs 115A and the ends of the other links being pivoted to uprights 113 below brackets 113A.

It thus will be seen that rails 115 may be shifted from a raised position, as shown in Fig. 9, and the upper portion of Fig. 8, in which the rail is supported by toggle 116 extended, to a lowered position, as shown in Fig. 10 and the lower portion of Fig. 8, may be returned as needed to the said raised position.

Each of the rails 115 is provided with a locking pawl 49 mounted upon horizontal webs 115B and including springs 51 and latching ends or fingers 48, as previously described, the fingers being adapted to extend through apertures formed in inner rail legs 115C, similar to the formation of aperture 47 heretofore described and the springs as heretofore described, urging the pawls into latching position.

In use of the improved stretcher with the supports just described, the open ends of end members 27 are engaged over rail legs 115C and the stretcher is slid along rails 115 until it has reached the mounted position, best shown in Fig. 8. Pawls 49 are retracted during this sliding movement and when the stretcher has been moved into mounted position the latching fingers of the pawls are introduced into latching engagement with the end members, each of the end members being provided with an aperture 53 formed therethrough and through which the latching finger of the pawl extends, effecting latching of the stretcher against accidental removal and permitting storage of the stretcher mounted upon the rails in lowered position of the rails, as shown in the lower portion of Fig. 8.

It is further desirable to provide for covers for the covering of persons placed upon the stretchers of the present invention and is preferred that these covers be in the form of a sleeping bag 59, which is supported by and preferably removably attached to webbing 37 of stretcher 24.

In the embodiment shown as illustrated in Figs. 8 and 12, the sleeping bag 59 is preferably provided with a pair of belt-like straps 61 which extend transversely of and below the sleeping bag, and in removably attaching the sleeping bag to the webbing, are, as shown in Fig. 12, preferably interlaced through webbing 37. Attachment is completed through the use of convenient attaching means, such as the buckles 63.

Thus the present invention embodies an improved stretcher having a frame, adapted for alternative engagement with transverse or longitudinal supports, and consisting of beam-like members adapted to maintain the rigidity of the frame in use. There is further embodied novel supporting means, preferably consisting of flanged rails and preferably including stretcher retaining latching means. It will be understood that variations may be made in detail of various of the parts herein without departing from the invention as defined in the appended claims.

I claim:

1. A carrier as for injured persons, comprising horizontally spaced, upright frame members; a plurality of horizontal rails arranged in vertically spaced pairs, each said rail consisting of an elongated H member having a vertical outer leg rigidly fixed to said frame members, an inwardly extending horizontal web, and a vertical inner leg; a plurality of stretchers each including outwardly open channel-shaped side runners having a vertical web and upper and lower horizontal flanges; said stretchers being positioned with said flanges slidably embracing said rail inner legs to slidably support said stretchers upon said rails; pawl means mounted on said rail webs, said pawl means including inwardly extending latching fingers, said rail inner legs being formed with apertures for receiving said latching fingers, complementary apertures formed in said runner webs registering with said rail leg apertures, and spring means urging said pawls to turn and extend said fingers into said registered apertures, said fingers respectively being of a length to extend inwardly through said registered apertures to releasably latch said stretchers to said rails against longitudinal sliding movement, said horizontal runner flanges being provided at their outer edges with vertical flange portions to block lateral movement of said runners relative to said rails.

2. A carrier as for injured persons, comprising horizontally spaced, upright frame members; a plurality of horizontal rails arranged in vertically spaced pairs, each said rail consisting of an elongated H member having a vertical outer leg rigidly fixed to said frame members, an inwardly extending horizontal web, and a vertical inner leg; a plurality of stretchers each including outwardly open channel-shaped side runners having a vertical web and upper and lower horizontal flanges; said stretchers being positioned with said flanges slidably embracing said rail inner legs to slidably support said stretchers upon said rails; pawl means mounted on said rail webs, said pawl means including inwardly extending latching fingers, said rail inner legs being formed with apertures for receiving said latching fingers, complementary apertures formed in said runner webs registering with said rail leg apertures, and spring means urging said pawls to turn and extend said fingers into said registered apertures, said fingers respectively being of a length to extend inwardly through said registered apertures to releasably latch said stretchers to said rails against longitudinal sliding movement.

3. A carrier as for injured persons, comprising a plurality of horizontal rails arranged in vertically spaced pairs, each said rail consisting of an elongated member having a horizontal web, and a vertical inner leg; means supporting said rails; a plurality of stretchers each including side runners having upper and lower flanges; said stretchers being positioned with said flanges slidably embracing said rail legs to slidably support said stretchers upon said rails; pawl means mounted on said rail webs, said pawl means including inwardly extending latching fingers, said rail legs being formed with apertures for receiving said latching fingers, complementary apertures formed in said runners registering with said rail leg apertures, said fingers respectively being positioned and of a length to extend inwardly through said registered apertures to releasably latch said stretchers to said rails against longitudinal sliding movement.

4. In combination for use as a stretcher, a generally rectangular frame consisting of side members of channel cross section having flat upper surfaces, and end members integrally joined to the ends of said side members, a body supporting webbing removably fixed to and spanning between said upper surfaces and said end members, handle members slidably housed in said side members for longitudinal movement from and to extended position, in which said handles project longitudinally beyond said end members, to and from housed position in which said handles lie within the rectangular limits of said frame, with the ends of said handles adjacent said end members, pins carried by said side members, slots having closed ends formed in said handles and slidably engaging said pins, said slot ends being spaced by the length of said slots to alternatively engage said pins during said longitudinal movements and prevent handle movement beyond said positions, said integrally joined side and end members being beveled adjacent their junctions to form truncated frame corners within the rectangular limits of said frame and provide access to said handle ends in said housed position.

5. In combination for use as a stretcher, a generally rectangular frame consisting of side members of channel cross section having flat upper surfaces, and end members integrally joined to the ends of said side members, a body supporting webbing removably fixed to and spanning between said upper surfaces and said end members, handle members slidably housed in said side members for longitudinal movement from and to extended position in which said handles project longitudinally beyond said end members, to and from housed position in which said handles lie within the rectangular limits of said frame, with the ends of said handles adjacent said end members, pins carried by said side members, slots having closed ends formed in said handles and slidably engaging said pins, said slot ends being spaced by the length of said slots to alternatively engage said pins during said longitudinal movements and prevent handle movement beyond said positions.

6. In combination for use as a stretcher, a generally rectangular frame consisting of side members, and end members integrally joined, body supporting means carried by said members, handle members slidably housed in said side members for longitudinal movement from and to extended position in which said handles project longitudinally beyond said end members, to and from said housed position in which said handles lie within the rectangular limits of said frame, with the ends of said handles adjacent said end members, pins carried by said side members, slots having closed ends formed in said handles and slidably engaging said pins, said slot ends being spaced by the length of said slots to alternatively engage said pins during said longitudinal movements and prevent handle movement beyond said positions.

7. Means for supporting injured persons, comprising supporting rails, each having a horizontal web, and a vertical inner leg; means supporting said rails; stretcher means including runners having upper and lower flanges; said stretcher means being positioned with said flanges slidably embracing said rail legs to slidably support said stretcher means upon said rails; pawl means mounted on said rail webs, said pawl means including inwardly extending latching fingers, said rail legs being formed with apertures for receiving said latching fingers, complementary apertures formed in said runners registering with said rail leg apertures, said fingers respectively being positioned and of a length to extend inwardly through said registered apertures to releasably latch said stretcher means to said rails against sliding movement.

8. Means for supporting injured persons, comprising substantially H-shaped rails, each having a horizontal web, and a vertical inner leg; upright members; means hingedly connecting said rails to said upright members; stretcher means each including channel runners having upper and lower flanges; said stretcher means being positioned with said flanges slidably embracing said rail legs to slidably support said stretcher means upon said rails; and means releasably latching said stretcher means to said rails against sliding movement.

9. In combination, a stretcher as for injured persons, including channel-shaped side runners, channel-shaped end members, said runners and members being open outwardly and at their ends and being integrally joined to form a unitary, beam-like, substantially rectangular frame, a webbing adapted to support a person spanning said frame from side to side and end to end and being removably attached to the sides and ends of said frame; and means for releasably fixing said stretcher to a support against sliding movement.

10. A stretcher as for injured persons, including channel-shaped side runners, channel-shaped end members; said runners and members being open outwardly and at their ends and being integrally joined to form a unitary, beam-like, substantially rectangular frame, and a webbing adapted to support a person, spanning said frame from side to side and end to end and being removably attached to the sides and ends of said frame.

11. Means for supporting injured persons, comprising supporting rails, each having a horizontal web, and a vertical inner leg; means supporting said rails; stretcher means including runners having upper and lower flanges; said stretcher means being positioned with said flanges slidably embracing said rail legs to slidably support said stretcher means upon said rails; and means to releasably latch said stretcher means to said rails against sliding movement.

CECIL C. NICHOLS.

REFERENCES CITED

The following references are of record in the file of this patent:

UNITED STATES PATENTS

| Number | Name | Date |
| --- | --- | --- |
| 1,691,621 | Young | Nov. 13, 1928 |